No. 625,029. Patented May 16, 1899.
F. W. GOW.
APPARATUS FOR TESTING METERS.
(Application filed Mar. 28, 1898.)
(No Model.)
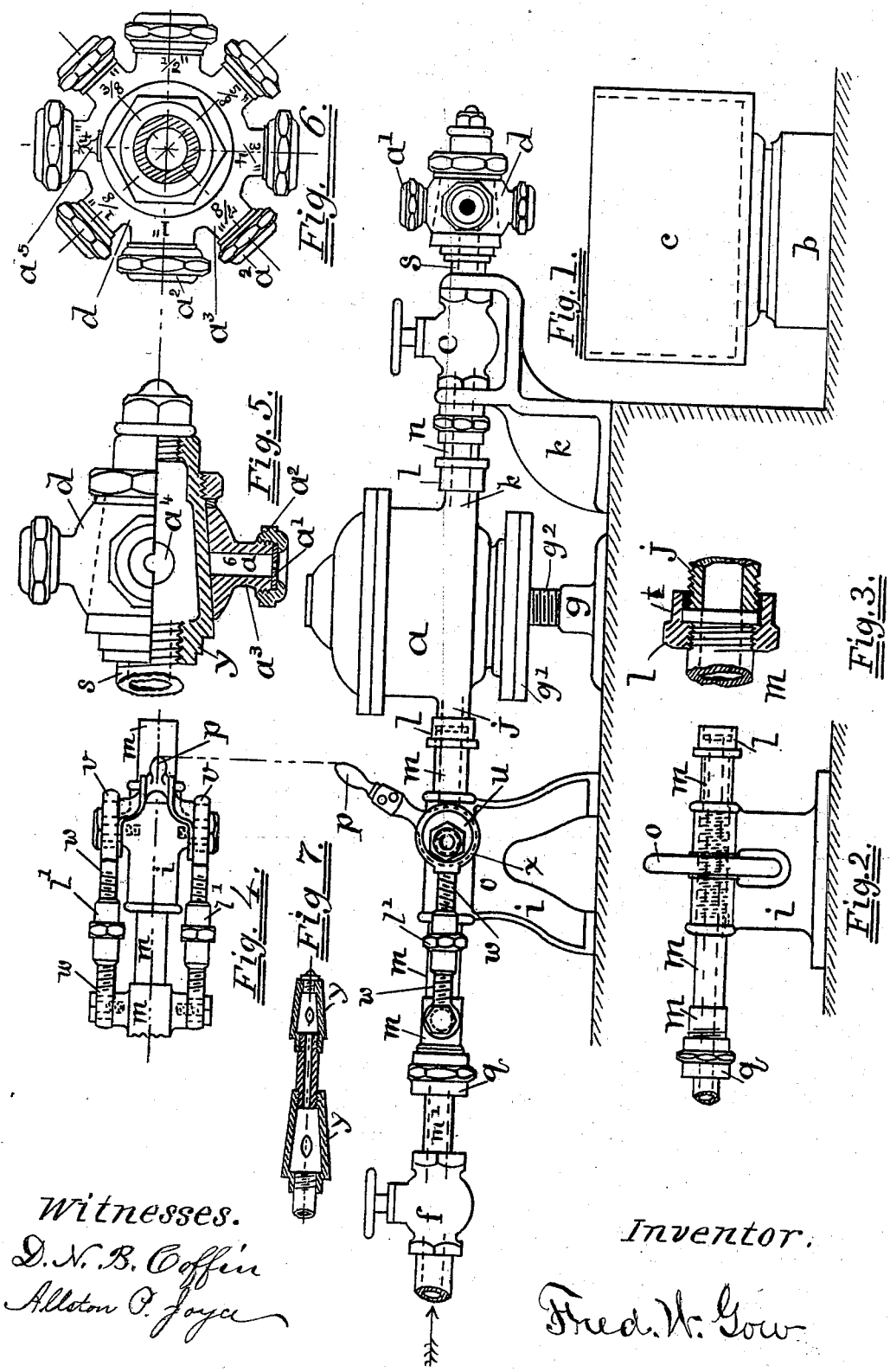
Witnesses.
D. N. B. Coffin
Alston P. Joye
Inventor.
Fred. W. Gow

UNITED STATES PATENT OFFICE.

FREDERICK WILLIAM GOW, OF MEDFORD, MASSACHUSETTS.

APPARATUS FOR TESTING METERS.

SPECIFICATION forming part of Letters Patent No. 625,029, dated May 16, 1899.

Application filed March 28, 1898. Serial No. 675,517. (No model.)

*To all whom it may concern:*

Be it known that I, FREDERICK WILLIAM GOW, of the city of Medford, county of Middlesex, and State of Massachusetts, have invented certain Improvements in Apparatus for Testing Meters, of which the following is a full and exact description, reference being had to the accompanying drawings, and to the letters of reference marked thereon, which drawings constitute a part of this specification, and of which—

Figure 1 is a general view in elevation of the apparatus embracing a meter in position for testing. Fig. 2 is a corresponding elevation of parts of the same somewhat modified. Fig. 3 is a sectional elevation of one of the compression sockets, washer, and meter-nozzle somewhat enlarged. Fig. 4 is a plan of parts shown in Fig. 1. Fig. 5 is a sectional elevation of one of the multiple delivery-cocks somewhat enlarged, four only of the nozzles being shown. Fig. 6 is an elevation of the same viewed in line with the pipe, view from the left. Fig. 7 is a sectional elevation of the plugs of two multiple delivery-cocks connected to illustrate the employment of several on one line of pipe.

The nature of my invention relates to combined and coöperative devices applied together to facilitate and perfect the testing of meters, their construction, arrangement, and combination, substantially as hereinafter more fully described.

The invention consists of the peculiar multiple delivery-cock, its stationary pipe, stop-cock, compression socket, washer, &c., the movable plunger-pipe, its compression socket, washer, devices for operating the same, and related parts as constructed and applied, all substantially as set forth.

The multiple delivery-cock has a taper-plug $y$ open in a longitudinal direction at both ends and is provided at each end opening with a screw-thread for the purpose of screwing thereto a connecting-pipe. Either of the end openings may be stopped with a screw-plug when desired, as shown at the right in Figs. 5 and 7. This plug $y$ has a single delivery-opening $a^4$ as large as or in excess of capacity over any of the several delivery-openings $a^6$ of the delivery-nozzles $a^3$. Any number of these delivery-nozzles may be provided upon the cock-body, limited only by the size of the body affording the space for their application. These delivery-nozzles are multiplied for the purpose of securing a series of graded sizes. Their capacity for delivery is further controlled, modified, or governed by means of the detachable disks $a'$, provided each with an opening smaller than the capacity of the delivery-nozzles. Any number and variety of capacity of these disks may be provided and are applied, held in place, and removed by means of the annular screw-cap $a^2$.

By means of the delivery-nozzles $a^3$ and their gradation, together with the graded delivery-disks $a'$, an almost unlimited gradation of capacity of the delivery-openings may be secured.

The multiple delivery-cock is mounted in connection with a delivery-pipe $s\ n$, provided with a stop-cock $c$ in any convenient and positive manner. The pipe $n$ is provided with the compression-socket $l$. This socket $l$ is adapted to inclose the delivery-nozzle of a meter (see meter $a$ and nozzle $k$, Fig. 1) and is provided with a suitable compression-washer of leather, rubber, or other suitable material. A similar compression socket and washer (see $l$, Fig. 1) are mounted on a movable compression plunger-pipe $m$ at the opposite side of the meter in any suitable and sufficient support, as $i$, Fig. 1. Various means may be employed to give this plunger-pipe and compression-socket the necessary impulse and force to make tight and waterproof the joints with the meter-nozzles $j\ k$, such as the screwed plunger-pipe and nut hand-wheel shown in Fig. 2; but a preferable device or means is shown in Fig. 1, where eccentric or eccentrics $u$ are mounted on journals carried by stand or frame $i$, being provided with lever-handles $p$, straps $x$, and rods $w$. The rods $w$ are adjustable in length by means of the right-and-left-screw turnbuckle $l'$. The rods are pivoted or journaled to the plunger $m$, and a suitable stuffing-box $q$ connects the movable plunger-pipe $m$ to a stationary pipe $m'$ and inlet valve or cock $f$. The stationary pipe $m'$ is fitted to slide freely in the movable plunger-pipe $m$ and affords or conducts the testing-supply to the plunger-pipe and the meter.

Whenever a larger variety is desired for the delivery nozzles and disks than is afforded by one multiple cock, the variety may be increased indefinitely by adding an additional cock or cocks, as indicated in Fig. 7, where a second plug is connected to the first.

Figs. 5 and 1 show the multiple cock as having only four delivery-nozzles, while in Fig. 6 eight are shown. In other respects the view is intended to show the same cock that is shown in Figs. 5 and 1. Numbers and a pointer indicate sizes.

Fig. 1 shows a tank $c$ resting upon scales $b$, which are used for weighing the water discharged from the multiple cock $d$.

The operation of the apparatus is as follows: The meter is placed upon the table $g'$, the screw-support $g^2$ being used to adjust it to the proper height. The meter-nozzle $k$ is placed in the compression-socket $l$, after which the plunger-pipe $m$, having the compression-socket $l$, is forced up the meter-nozzle $j$ within the compression-socket until the sufficient compression is obtained to produce water-tight junction with the meter-nozzles, the eccentric-rods being first adjusted by turnbuckles $l'$, so that the full throw or nearly of the eccentric will yield that required compression. The eccentrics being at or about full throw will ordinarily be a lock to themselves; but a set-screw or any convenient means, locknotch or otherwise, may be used to make doubly secure the locking of the eccentric, after which the proper-sized disk and nozzle being turned into connection with the plug-delivery orifice $a^4$ the water let on by cock or valve $f$ may be further controlled or shut off by valve $e$, which is in same relation to meter as in ordinary service. The water being weighed on scale $b$ serves to determine the correctness of registration by the meter.

The various requirements in meter-testing and the operations to be performed need not be further explained, as the adaptation and uses of the testing apparatus will be fully understood by those familiar with the service. The materials also to be used in the construction of the apparatus will be such as are usually employed and can be readily selected by those practiced in the art.

The cock-bodies may be made stationary and the plugs be made to turn in the ordinary manner; but this is not regarded as so simple and satisfactory as the method described.

Having described my invention, what I claim, and desire to secure by Letters Patent, is as follows:

1. In a meter-testing apparatus in combination with the multiple cock, the connecting and inlet pipe having the meter-connecting compression sockets and washers the plunger inlet-pipe, and means for making the compression water-tight contact, substantially as shown and described.

2. In a meter-testing apparatus, the screw elevating and adjusting table in combination with the fixed delivery and plunger compression-pipes and means for making the compression contact, substantially as shown and described.

3. In a meter-test mechanism the eccentrics, adjustable eccentric-rods eccentric-lever the fixed delivery-pipe, the plunger-pipe and the compression sockets and washers in combination, substantially as shown and described.

4. In a meter-test apparatus the multiple delivery-cock, having each several delivery-nozzle constructed with a different size of delivery-orifice from the others, and a hollow plug with a single opening so providing a graded set of delivery-orifices in a single cock having a single plug and single plug-opening, substantially as shown and described.

5. In a meter-testing apparatus the combination of an inlet-pipe provided with a compression-joint-making device an intermediate, adjustable, meter-bearing support and a stationary delivery-pipe provided with a joint-making device and graduated variable delivery-orifices, substantially as shown and described.

FREDK. WILLIAM GOW.

Witnesses:
  D. N. B. COFFIN,
  ALLSTON P. JOYCE.